UNITED STATES PATENT OFFICE.

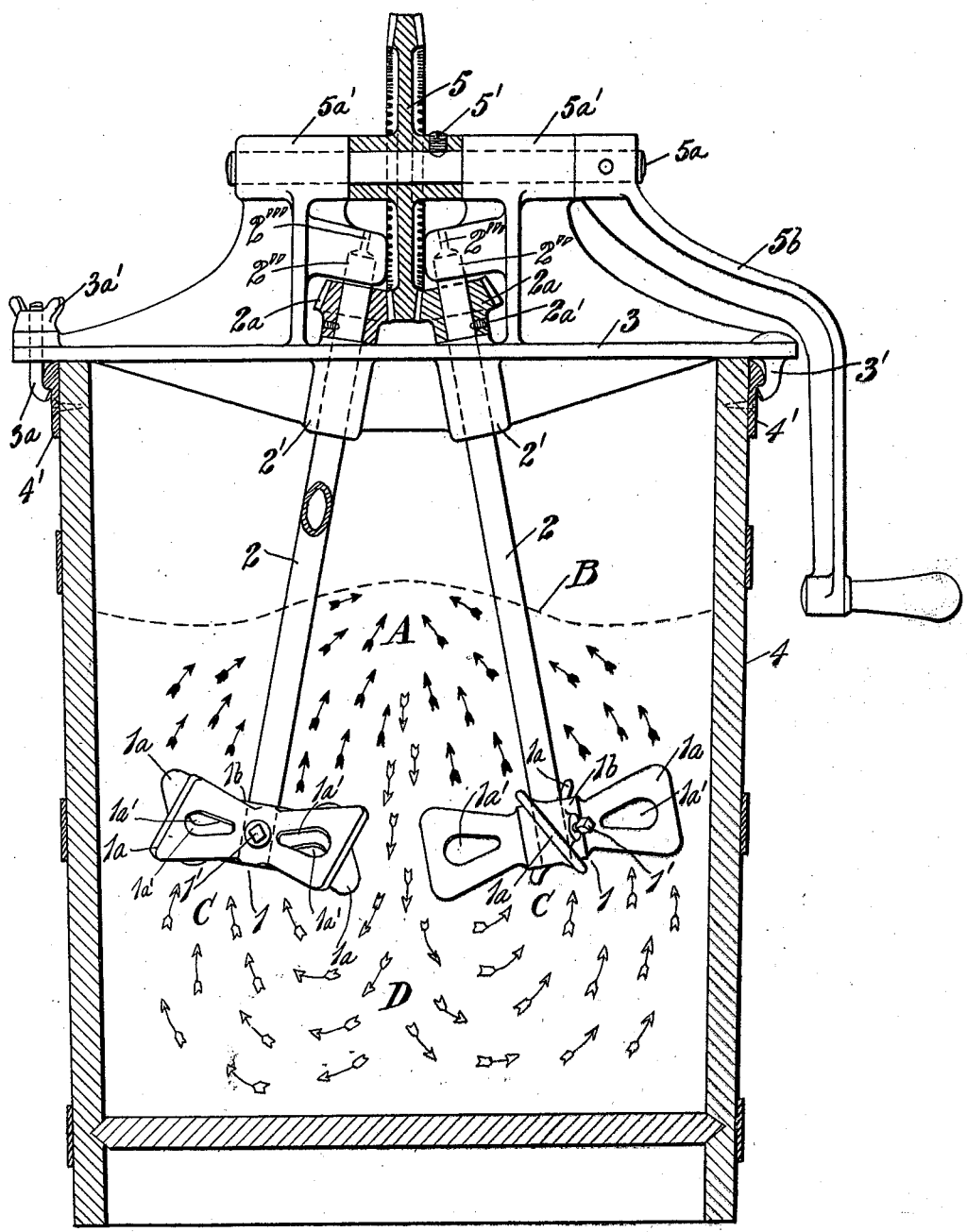

ALPHEUS FAY, OF LOUISVILLE, KENTUCKY.

CHURN.

1,023,368.  Specification of Letters Patent.  Patented Apr. 16, 1912.

Application filed January 16, 1911. Serial No. 603,020.

*To all whom it may concern:*

Be it known that I, ALPHEUS FAY, a citizen of the United States, residing at Louisville, in the county of Jefferson and State of Kentucky, have invented a certain new and useful Churn, of which the following is a specification.

My invention relates to churns, and has for its object the more efficient and rapid formation of butter from cream or milk, by producing collision of the cream or milk particles to break up the fatty globules.

My invention consists in the combination of two agitators each operating in a direction inclined toward the direction of operation of the other, together with suitable means for actuating the agitators, and in the details of construction and arrangement which will hereinafter be more fully described and claimed.

In the drawing forming part of this specification, I have illustrated a churn embodying my invention, the view being a vertical sectional side elevation.

In this illustration the principle of the operation is exemplified by the two agitators 1, each comprising four blades $1^a$, mounted on a central hub $1^b$, the surfaces of the blades on each agitator being inclined to the axis of the hub, uniformly in one direction therearound, and each of the blades preferably being provided with an opening $1^{a\prime}$ to better adapt them for producing agitation in the liquid to be operated upon. Each of the said agitators 1 is mounted on the lower end of a shaft 2, which shafts 2 are preferably tubular as indicated, and which have bearings $2'$ in a bracket 3, that extends horizontally across the vessel 4, and is clamped thereto by means of a hook $3'$ engaging with a lug $4'$ on one side, and by means of a bolt $3^a$ engaging with a similar lug $4'$ on one side, and by means of a bolt $3^a$ engaging with a similar lug $4'$ on the other side, and drawn tightly thereagainst by means of a thumb screw $3^{a\prime}$.

In order that the agitators 1 may each operate in a direction inclined to the direction of operation of the other, the two shafts 2 upon which they are mounted have their bearings $2'$ so formed in the bracket 3 that the said shafts 2 diverge downwardly into the vessel, whereby when the agitators operate in direction parallel to their shafts, the currents in the liquid thus induced will collide in the region A, near the upper surface of the liquid indicated by the broken line B. The two agitators 1 are preferably of opposite pitches and the shafts 2 upon which they are mounted are rotated in opposite directions by means of bevel pinions $2^a$ rigidly mounted on said shafts above their bearings $2'$, in mesh with the double bevel gear 5 that is mounted to rotate in a vertical plane with the horizontal shaft $5^a$ that has bearings $5^{a\prime}$ in said bracket 3. This shaft $5^a$ is provided with a handle $5^b$ for manually operating the churn. The shafts 2 project above the bevel pinions $2^a$, and bear in upper bearings $2''$ which also form part of the bracket 3, and are far enough apart to admit the double bevel gear 5 between them. These bearings $2''$ have openings $2'''$ in them above the ends of the tubular shafts 2 to form communication between the interiors of said shafts and the atmosphere, so that air may pass downward through the shafts into the regions C immediately below the agitators 1, in which regions a partial vacuum is produced by the operation of said agitators. The entire bracket 3 with its bearings $2'$ and $2''$ for the shafts 2, and bearings $5^{a\prime}$ for the shaft $5^a$ is preferably formed integral as illustrated, so that it is of simple construction and is adapted to permanently maintain the alinement of the various shafts for which it contains the bearings, and thus insure continued accuracy in the operation of the entire machine. In accordance with this construction, the bevel pinions $2^a$ are secured on the shafts 2 by means of set screws $2^{a\prime}$, and the double bevel gear 5 is secured on the shaft $5^a$ by means of set screws $5'$, which means of attachment allows the shafts to be inserted into the bearings longitudinally, the gears being placed between the bearings when the shafts are inserted and then rigidly secured to said shafts by tightening the screws. The agitators 1 are similarly mounted on the lower ends of the shafts 2 by means of set screws $1'$.

The most efficient action is obtained when the agitators 1 are positioned about midway the depth of the liquid in the vessel, as indicated, so that the upwardly directed currents of liquid above the agitators may converge and collide in the region A adjacent to the upper surface of the liquid and the disrupted fatty globules of the liquid may then pass downward under the action of gravity between the agitators to the region D adjacent to the bottom of the vessel, where the butter from said globules is deposited. Under the action of this gravitation, upward currents of the liquid will be induced in the regions C below the agitators, so that two continuous circuits of moving liquid will be maintained, colliding in the upper part of the liquid, and parting with their fatty matter at the bottom of the vessel.

In the drawing the upward currents of liquid above the agitators are indicated by the black arrows, while the descending currents between the agitators and the upward currents below the agitators are indicated by white arrows. In conjunction with this operation, the upper surface of the liquid will be distorted as indicated by the broken line B, the liquid being drawn away from the sides of the vessel and concentrated in the central regions, so that troublesome deposits of butter will not be formed to any considerable extent on the sides of the vessel.

By thus providing the simple agitators operating in opposed order, and producing collision of the liquid particles in the central region of the vessel, thus concentrating and intensifying the separating operation, and confining the deposit of butter substantially to the center of the vessel, it is found that the greatest amount of butter may be separated from the milk or cream with the least exertion, effecting economy in labor due to the thorough separation of the full amount of butter fats from the milk or cream.

While I illustrate and describe a device specifically herein, as an example of the principle of my invention, such as is especially adapted for accomplishing the purpose thereof, it will be understood that considerable variation in detail is possible without departure from the scope and spirit of the invention, and therefore, I do not wish to be understood as limiting myself to said illustration and specific description, but

What I claim as new and desire to secure by Letters Patent, is:

1. In a churn, the combination with a vessel containing liquid, of agitators in said liquid, adapted to induce upwardly directed currents of said liquid inclined toward each other, and producing collision thereof in a region central of said vessel.

2. In a churn, the combination with a vessel containing liquid, of agitators positioned substantially midway of the depth of said liquid, and adapted to induce upwardly directed currents in said liquid colliding in a region central of the vessel, adjacent to the upper surface of said liquid, said agitators being separated to allow the passage of the collided liquid downward, and a space being left in the lower region of the vessel, whereby the collided liquid may deposit its fatty matter.

3. In a churn, agitators with helically disposed blades, said agitators being juxtaposed at such distance each from the other that their circles of rotation do not intersect, and the axis of rotation of each agitator being inclined to the axis of rotation of the other, and means for rotating said agitators, for the purposes set forth.

4. In a churn, agitators with helically disposed blades, and with axes of rotation each inclined toward the other upwardly, said agitators being juxtaposed at such distance apart that their circles of rotation do not intersect, and each having a tubular shaft leading from a region above to a region below its blades, for the purposes set forth.

5. In a churn, agitators, downwardly diverging shafts, on the lower ends of which said agitators are mounted, respectively, to rotate therewith, said agitators comprising blades adapted to impel liquid longitudinally of their respective shafts, the pitch of the blades on one of said agitators being opposite to the pitch of the blades on the other agitator, means for rotating said shafts and their agitators in opposite directions, and a vessel in which said agitators operate, for the purposes set forth.

6. In a churn, agitators, downwardly diverging tubular shafts, on the lower ends of which said agitators are mounted, respectively, to rotate therewith, said agitators comprising blades adapted to impel liquid longitudinally of their respective shafts and to produce a partial vacuum in the vicinity of each shaft, means for rotating said agitators, and a vessel in which said agitators operate, for the purposes set forth.

7. In a churn, agitators, downwardly diverging tubular shafts, on the lower ends of which said agitators are mounted, respectively, to rotate therewith, said agitators comprising blades adapted to impel liquid longitudinally of their respective shafts, the pitch of the blades on one of said agitators being opposite to the pitch of the blades on the other agitator, means for rotating said shafts and their agitators in opposite directions, and a vessel in which said agitators operate, for the purposes set forth.

ALPHEUS FAY.

Witnesses:
HATTIE M. FAY,
MILES S. FAY.

Copies of this patent may be obtained for five cents each, by addressing the "Commissioner of Patents, Washington, D. C."